United States Patent [19]
Brown et al.

[11] Patent Number: 5,779,914
[45] Date of Patent: Jul. 14, 1998

[54] METHODS FOR SANITIZING WATER

[75] Inventors: Geoffrey A. Brown, Lithonia; Ron Starkey, Lawrenceville, both of Ga.

[73] Assignee: Bio-Lab, Inc., Decatur, Ga.

[21] Appl. No.: 675,042

[22] Filed: Jul. 3, 1996

[51] Int. Cl.$^6$ ..................................................... C02F 1/50
[52] U.S. Cl. .......................... 210/754; 210/749; 210/759; 210/764
[58] Field of Search ..................... 210/759, 764, 210/749, 754

[56] References Cited

U.S. PATENT DOCUMENTS

| | | | |
|---|---|---|---|
| 3,386,915 | 6/1968 | Rutschi et al. | 210/62 |
| 4,253,971 | 3/1981 | MacLeod et al. | 210/759 |
| 5,142,002 | 8/1992 | Metzner | 525/540 |
| 5,368,749 | 11/1994 | La Zonby | 210/756 |
| 5,371,083 | 12/1994 | Hollis et al. | 514/241 |
| 5,399,288 | 3/1995 | Marzouk et al. | 252/186.21 |
| 5,501,802 | 3/1996 | Thorp et al. | 210/758 |

FOREIGN PATENT DOCUMENTS

| | | | |
|---|---|---|---|
| 2 636 239 A1 | 9/1988 | France | A61K 31/155 |

OTHER PUBLICATIONS

Sheppard, C.S. and Mageli, O.L. "Peroxides and Peroxy Compounds, Organic," in *Kirk–Othmer Encyclopedia of Chemical Technology*, John Wiley & Sons (New York). vol. 17, 1984, pp. 27–90.

Morris, R. 1992. "Reducation of Microbial Levels in Sewage Effluents Using Chlorine and Peracetic Acid Disinfectants." *Water Sci. Technol.* 27(3–4, Health Related Water Microbiology).

Baldry, M.G.C., French, M.S. and Slater, D., 1991. "The Activity of Peracetic Acid on Sewage Indicator Bacterial and Viruses." *Water Sci. Technol.* 24(2), 353–357.

Noack, M.G. and Doerr, R.L. "Chlorine Oxygen Acids and Salts ($ClO_2$)," in *Kirk–Othmer Encyclopedia of Chemical Technology*, by John Wiley & Sons (New York). vol. 5, 1984, pp. 612–632.

Swern, D. "Organic Peroxy Acids–Preparation, Properties, and Structure", in *Organic Peroxidess*, Wiley–Interscience, vol. I, 1970, pp. 313–474.

*Primary Examiner*—Neil McCarthy
*Attorney, Agent, or Firm*—Woodard, Emhardt, Naughton, Moriarty & McNett

[57] ABSTRACT

A method of treating water with peroxyacids and/or chlorine dioxide to supplement PHMB and/or $H_2O_2$ and/or polyquaternary ammonium compounds and/or boron-containing compounds.

8 Claims, 1 Drawing Sheet

METHODS FOR SANITIZING WATER

FIELD OF THE INVENTION

The present invention relates to methods of using peroxyacids and/or chlorine dioxide to treat swimming pools sanitized with PHMB or other sanitizing agents. A method for the "on site" generation of such peroxyacids is also disclosed.

BACKGROUND TO THE INVENTION

The use of swimming pool sanitizers that do not release free chlorine into the pool water has become increasingly popular as environmental concerns relating to the use of chlorine have become more commonly known. In particular, swimming pool disinfectants such as polyhexamethylene biguanide ("PHMB"), hydrogen peroxide ("$H_2O_2$") and polyquaternary ammonium compounds ("polyquats") such as 1,6-hexanediamine-N,N,N',N'-tetramethyl polymer with 1,6-dichlorohexane ("Q6/6") have increasingly garnered broad support in the pool & spa water community. These "non-chlorinating" disinfectants provide good sanitation to the water, and also are generally less irritating to swimmers than chlorine. Additionally, swimming pool sanitizers that do not release free chlorine are less prone to bleach swim wear, and are less caustic to equipment used in the swimming pool area.

One disadvantage of common non-chlorinating sanitizers is that they lack a strong oxidizer (i.e. chlorine) which is generally necessary to prevent problems such as cloudy water and discoloration of pool surfaces. Accordingly, it is known to the art that pools sanitized with PHMB, polyquats or $H_2O_2$ may periodically require strong oxidation treatments to destroy peroxide resistant organic materials which can hamper system performance, cause cloudy water or produce displeasing odors. Oxidizers can also be used to bleach aesthetically displeasing colors and deposits.

The most common strong oxidizer for pool water is, of course, chlorine. Unfortunately, while chlorine shock treatments will destroy organics and slimy deposits, chlorine will also destroy PHMB and $H_2O_2$. Oxygen releasing products like potassium peroxymonopersulfate will not degrade peroxide, but they are not strong enough to correct many of the recalcitrant problems which may routinely occur in a pool or spa. Therefore, strong shock treatments needed to correct severe pool problems have not been available for PHMB- or $H_2O_2$-treated pools.

A need therefore exists for a method of shock treating pools routinely treated with PHMB and/or $H_2O_2$ and polyquats and/or potentiating adjuvants such as polyquaternary ammonium compounds. The present invention addresses this need.

SUMMARY OF THE INVENTION

According to one preferred embodiment of the present invention there is provided a method of using a peroxyacid, such as peracetic acid, to treat the water of a recirculating water system. In one preferred embodiment, peracetic acid is used in conjunction with PHMB. In another preferred embodiment peracetic acid is used in conjunction with $H_2O_2$ and polyquats. In a third preferred embodiment, peracetic acid is used in conjunction with a polyquaternary ammonium compound, while in a fourth preferred embodiment peracetic acid is used in conjunction with a boron-containing compound. In some preferred embodiments the peracetic acid is routinely provided to the water at maintenance levels, while in other preferred embodiments the peracetic acid is used only occasionally to shock treat the water.

According to another preferred embodiment of the present invention there is provided a method of using chlorine dioxide to treat the water of a recirculating water system. In one preferred embodiment, chlorine dioxide is used in conjunction with PHMB, while in another preferred embodiment chlorine dioxide is used with $H_2O_2$ and polyquats. In a third preferred embodiment, chlorine dioxide is used in conjunction with a polyquaternary ammonium compound, while in a fourth preferred embodiment chlorine dioxide is used in conjunction with a boron-containing compound. The chlorine dioxide is preferably used only occasionally to shock treat the water.

DESCRIPTION OF THE PREFERRED EMBODIMENT

Figure 1:
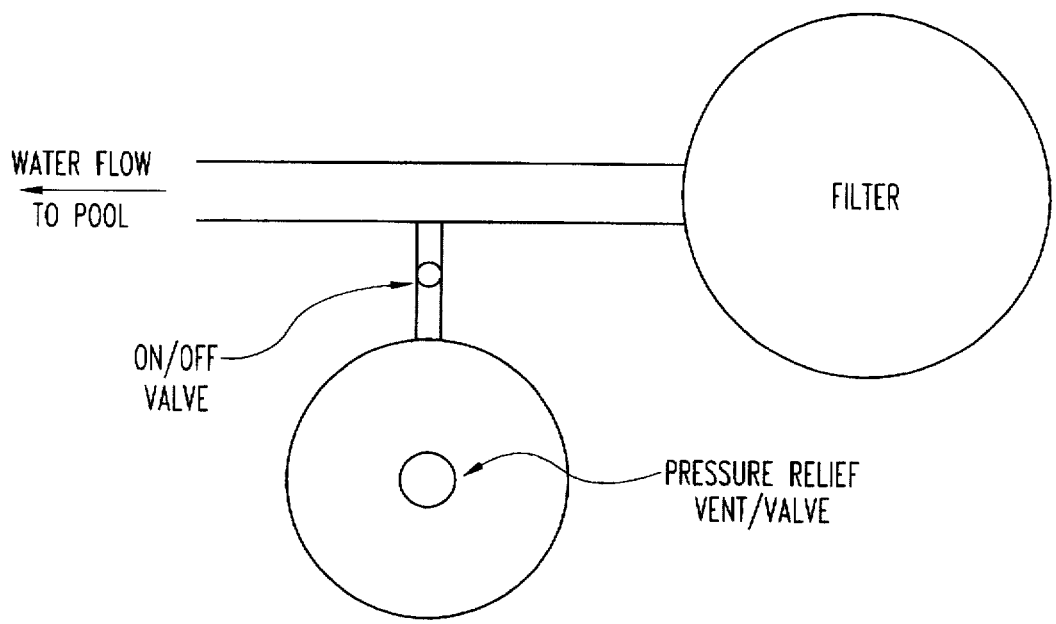
FIG. 1 is a schematic diagram showing a peroxyacid feeding device according to the present invention.

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

As indicated above, the present invention relates to methods of using a peroxyacid, such as peracetic acid, or chlorine dioxide to treat the water of a recirculating water system. In one preferred embodiment, peracetic acid is used in conjunction with PHMB, while in another preferred embodiment peracetic acid is used in conjunction with $H_2O_2$. In a third preferred embodiment, peracetic acid is used in conjunction with a polyquaternary ammonium compound stabilizer or potentiating adjuvant, while in a fourth preferred embodiment peracetic acid is used in conjunction with a boron-containing compound such as sodium tetraborate, perborates or boric acid, or combinations thereof. In some preferred embodiments the peracetic acid is routinely provided to the water at maintenance levels, while in other preferred embodiments the peracetic acid is used only occasionally to shock treat the water.

In other preferred embodiments, chlorine dioxide is used in conjunction with PHMB, while in yet other preferred embodiments chlorine dioxide is used in conjunction with $H_2O_2$. In a further preferred embodiment, chlorine dioxide is used with a polyquaternary ammonium compound, while in another preferred embodiment chlorine dioxide is used in conjunction with a boron-containing compound. The chlorine dioxide is preferably used only occasionally to shock treat the water.

As to the compounds used in the present invention, poly-(iminoimidocarbonyl-iminoimidocarbonyliminohexamethylene) chloride (also called polyhexamethylene biguanide or PHMB) is used in certain preferred embodiments. That compound is well known to the art and can be obtained from commercial sources.

Hydrogen peroxide is also well known, and can be obtained from known commercial sources.

In some preferred embodiments the pool is routinely treated with polyquaternary ammonium compounds (polyquats) such as 1,6-hexanediamine-N,N,N',N'-tetramethyl polymer with 1,6-dichlorohexane (Q6/6, also identified as polyhexamethylenedimethyl ammonium chloride) and two of its homologs (Q6/12 and Q6/4). These compounds are known to the art and may be prepared as described, for example, in U.S. Pat. No. 5,142,002 to Metzner. In addition, the polyquaternary ammonium compound poly[oxyethylene-(dimethylimino) ethylene-(dimethylimino) ethylene dichloride] (PDED) may be used.

In other preferred embodiments the water is routinely treated with boron-containing compounds such as sodium tetraborate, boric acid, sodium perborate or some combinations thereof.

The secondary treatment chemical may be either a peroxyacid, such as peracetic acid ("PAA"), or chlorine dioxide. An effective PAA treatment can be provided by a ready made solution or by a solution prepared on site by the end user or service technician.

PAA is preferably prepared by mixing an equimolar mixture of acetic acid and peroxide. Two percent $H_2SO_4$ (in acetic acid) serves as the acidified catalyst.

Since PAA is less stable than $H_2O_2$ and occasionally requires special shipping and handling precautions, it may be advantageous to generate PAA on site. In this case, the individual components ($H_2O_2$ and acid catalyst) could be mixed prior to use, ensuring the full potency of the PAA. The amount of PAA formed would be dependent upon the starting $H_2O_2$ concentration. One preferred embodiment uses 27.5–40% $H_2O_2$ with an equimolar mount of acetic acid with 2% sulfuric acid. A solution containing 30% $H_2O_2$ with an equimolar quantity of acidified catalyst could be expected to form about 10% PAA within a few hours (13).

Chlorine dioxide in a known chemical and can be obtained by known methods. Preferably, the chlorine dioxide is produced on site to avoid transportation and handling issues.

As to the preferred concentrations of the compounds used in the present invention, water sanitized with PHMB preferably has 0.1 ppm to 100 ppm residual PHMB in the water. Preferred concentrations are 0.5 ppm to 10 ppm PHMB.

Water sanitized with $H_2O_2$ and polyquats preferably has 0.05 ppm to 200 ppm residual $H_2O_2$ in the water. Preferred concentrations are 10 ppm to 50 ppm $H_2O_2$.

Water sanitized with polyquats preferably has 0.05 ppm to 75 ppm residual polyquat in the water. Preferred concentrations are 2 ppm to 10 ppm polyquat.

Water sanitized with boron-containing compounds preferably has 1 ppm to 200 ppm residual boron-containing compound in the water. Preferred concentrations are 25 ppm to 50 ppm boron-containing compound.

As to PAA, maintenance levels of PAA are preferably between about 0.1 ppm and 200 ppm PAA. More preferred concentrations are 5 ppm to 20 ppm PAA. Shock treatment levels of PAA are preferably between about 0.1 ppm and 300 ppm PAA. More preferred shock treatment concentrations are 10 ppm to 50 ppm PAA.

Shock treatment levels of chlorine dioxide are preferably between about 0.1 ppm and 500 ppm chlorine dioxide. More preferred shock treatment concentrations are 1 ppm to 10 ppm chlorine dioxide.

The methods of use comprise providing sanitizers and the novel PHMB compatible oxidizers to the water in amounts appropriate to provide the desired levels. With the maintenance level methods, both the sanitizers and the PHMB compatible oxidizers are maintained in the water routinely, while with the shock treatment methods the oxidizer is added only periodically, as needed to provide effective control.

Reference will now be made to specific examples illustrating the preferred methods of the present invention. It is understood that the examples are provided to more completely describe referred embodiments, and that no limitation to the scope of the invention is intended thereby.

EXAMPLE 1

The ability of PAA to decolorize a pool with green and yellow algae was tested in a 20,000 gallon pool that was being treated with $H_2O_2$ and polyquats. One-half of the pool was brushed and the other half was not. Two gallons of 15% PAA were added to give a residual of 15 PPM. Within 24 hours, the deposits were noticeably less green. After 7 days, most of the green and yellow was completely decolorized. Moreover, there was no subsequent redeposition of green deposits on the area that had been brushed. Although a similar result might have been achieved with a chlorine shock, the surprising effectiveness of PAA precluded the need for a halogen treatment which would have destroyed the $H_2O_2$ sanitizer.

EXAMPLE 2

After about 3 months, green algae reappeared in the 20,000 gallon pool referenced in Example 1. The deposits were vacuumed and collected on the filter. After backwashing, the pool was shock chlorinated with 12 pounds of lithium hypochlorite. Normal use rates specify one pound for every 6,000 gallons of water (i.e., 3–4 pounds per 20,000 gallons). Within one week, heavy redeposition of the algae occurred. PAA was prepared in situ by blending 4 gallons of 30% $H_2O_2$ with 2 gallons of acidified catalyst. The solution was allowed to sit for approximately 4.5 hours prior to addition. The pool surfaces were not brushed prior to adding PAA. Surprisingly, the algae began to lose color within 24 hours and was almost completely bleached within 7 days.

The use of a non-halogen oxidizer that shows greater bleaching potential than a triple dose of chlorine is very surprising. The fact that deposits that were in areas of low circulation were also decolorized was an additional, unexpected result.

EXAMPLE 3

A 5,000 gallon pool treated with PHMB had developed green and brown deposits on the pool's surfaces. PAA was generated in situ by mixing one gallon of $H_2O_2$ with one-half gallon of acidified catalyst and allowing the mixture to sit for 4.5 hours prior to application. Within 4 days, green algae and brown deposits had been effectively decolorized. There was no resulting loss of PHMB as would be expected with a strong oxidizer. There was no deterioration in water quality as would be expected with such a strong oxidizer in a PHMB pool.

EXAMPLE 4

A 5,000 gallon pool (treated with PHMB) had thick, green algae which formed a paste on a cartridge filter. With the pump off, sodium chlorite (334 g) was added to the skimmer followed by 420 ml of 36% HCl. The pump was turned on and shut off when chlorine dioxide was observed exiting the returns. After 20 minutes, the pump was turned on again and the remaining chlorine dioxide entered the pool. When the cartridge was removed the green algae were white, evidence of bleaching by chlorine dioxide. There was no deterioration in water quality as would be expected with such a strong oxidizer in a PHMB pool. The actual PHMB concentration was measured as 30 ppm before and after chlorine dioxide application.

On some occasions, chlorine is used to oxidize the plumbing of PHMB pools. However, the chlorine is backwashed out and none of it is allowed to enter the pool. Inadvertently allowing the chlorine to circulate into the pool will immediately destroy the water quality. In summary, the above example could not have been performed as disclosed with oxidizers such as chlorine, bromine or other strong oxidizers.

EXAMPLE 5

A 5,000 gallon pool treated with PHMB developed green deposits. When the sand filter was examined, a prominent, green algae deposit was observed. Chlorine dioxide was formed as described as disclosed in Example 4. After 20 minutes, the green color in the filter had been completely bleached and the sand returned to its normal brown color.

EXAMPLE 6

Because PAA is less stable than $H_2O_2$, the use of in situ generated PAA may be of significant commercial value for treating regulated waters. However, this will require the end user to mix acidified catalyst with concentrated (30% or higher) $H_2O_2$. In order to dramatically reduce the risks associated with mixing chemicals, a schematic of a prototypical device for a pool has been outlined in FIG. 1. The pool operator would remove the lid to add the components (peroxide and acid catalyst). Alternatively, the chemicals could be added to a sealed device through filling ports. After a minimum of about 4.5 hours, the pool operator would switch the on/off valve to the "on" (open) position and the in situ generated PAA would enter the pool through the plumbing (FIG. 1.).

EXAMPLE 7

Figure 2:
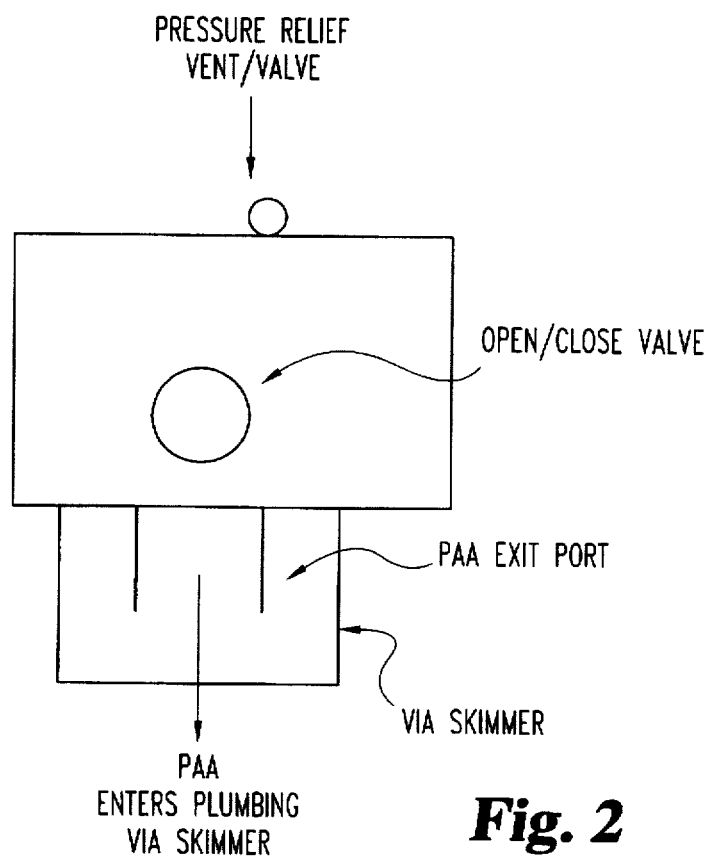
FIG. 2 shows a second device for generating peroxyacids on site, according to one preferred embodiment of the present invention.

In some cases, pool owners may not wish to adapt their existing plumbing to accommodate a device such as is described in Example 6. For these end users, a similar device which fits directly over the skimmer may be of value. It is described in FIG. 2.

EXAMPLE 8

A 30,000 gallon consumer pool maintained on PHMB developed cloudy water and white, paper-like deposits on the bottom of the pool. These deposits were described as white water mold by the consumer and they billowed up from the bottom when brushed. Six gallons of PAA were added to this pool. Within four days the turbidity dropped from 2.0 to 0.93 NTU (NTU-Nephelometric turbidity units). Water with a reading of 0.32 NTU or below is generally considered clear. Moreover, the white deposits were gone and could not be detected even when the pool was brushed. Three days later the turbidity dropped to 0.73 NTU.

EXAMPLE 9

A 28,000 gallon consumer pool maintained on PHMB developed pink slime in the skimmer. Three gallons of PAA were added to the pool and the pink slime was not physically removed. Four days later the pink slime had turned brown, most of which had been subsequently dislodged.

EXAMPLE 10

A consumer with a chlorine pool (20,000 gallons) was experiencing persistent cloudiness although her chlorine levels were being maintained at greater than 5 ppm. Typically, one to three parts per million of chlorine are recommended for use in residential swimming pools in order to maintain clear, sanitized water. Two gallons of PAA (ca. 15%) were added. The consumer noted that the water had cleared within three days and her family had resumed swimming.

EXAMPLE 11

A consumer with a PHMB sanitized pool noticed a persistent, disagreeable odor in her 25,000 gallon pool. Two-and-one-half gallons of PAA (ca. 15%) were added. The consumer indicated that the odor was gone within 24 hours.

EXAMPLE 12

A pool is treated with a boron-containing compound to achieve and optimal level of boon between 25–50 ppm. The boron acts to stabilize PAA in addition to helping to maintain clear water. Peracetic acid (ca. 10–20 ppm) is added weekly in order to oxidize and sanitize water. Should problems occur in such a system (e.g., cloudy water, malodors, algae, etc.), a consumer would have the option of using an additional dose of PAA or shock chlorination.

While the invention has been illustrated and described in detail in the foregoing description, the same is to be considered as illustrative and not restrictive in character, it being understood that only the preferred embodiment has been shown and described and that all changes and modifications that come within the spirit of the invention are desired to be protected.

What is claimed is:

1. A method of treating water, comprising:
    (a) maintaining in the water between about 0.1 ppm and about 100 ppm polyhexamethylenebiguanide; and additionally
    (b) maintaining in the water between about 0.1 ppm and about 200 ppm of a peroxyacid.

2. The method of claim 1, wherein said method comprises:
    (a) maintaining in the water between about 5 ppm and about 10 ppm polyhexamethylenebiguanide; and additionally
    (b) maintaining in the water between about 5 ppm and about 20 ppm of a peroxyacid.

3. The method of claim 1, wherein said peroxyacid is peracetic acid.

4. The method of claim 2, wherein said peroxyacid is peracetic acid.

5. A method of treating water, comprising:
    (a) routinely maintaining in the water between about 0.1 ppm and about 100 ppm polyhexamethylenebiguanide; and additionally
    (b) periodically providing to the water between about 0.1 ppm and about 300 ppm of a member selected from the group consisting of peroxyacids and chlorine dioxide.

6. The method of claim 5, wherein said method comprises:

(a) routinely maintaining in the water between about 5 ppm and about 10 ppm polyhexamethylenebiguanide; and additionally (b) periodically providing to the water between about 10 ppm and about 50 ppm of a member selected from the group consisting of peroxyacids and chlorine dioxide.

7. The method of claim 5, wherein said peroxyacid is peracetic acid.

8. The method of claim 6, wherein said peroxyacid is peracetic acid.

* * * * *

UNITED STATES PATENT AND TRADEMARK OFFICE
CERTIFICATE OF CORRECTION

PATENT NO : 5,779,914
DATED : July 14, 1998
INVENTOR(S): Geoffrey A. Brown and Ron Starkey It is certified that error appears in the above-identified patent and that said Letters Patent is hereby corrected as shown below:

On the title page, [56], under "U.S. Patent Documents," please add the following:

--5,393,781     2/1995      Vegega et al.
  5,478,482    12/1995      Jones et al.--

Signed and Sealed this

Twenty-ninth Day of June, 1999

Attest:

Q. TODD DICKINSON

*Attesting Officer*   *Acting Commissioner of Patents and Trademarks*